United States Patent [19]

Walker

[11] Patent Number: 4,752,751
[45] Date of Patent: Jun. 21, 1988

[54] REFERENCE CIRCUIT FOR ALTERNATOR OUTPUTS

[75] Inventor: Charles S. Walker, Seattle, Wash.

[73] Assignee: Honeywell Inc., Minneapolis, Minn.

[21] Appl. No.: 830,894

[22] Filed: Feb. 14, 1986

Related U.S. Application Data

[63] Continuation-in-part of Ser. No. 562,125, Dec. 16, 1983, abandoned.

[51] Int. Cl.$^4$ .................. H03H 7/09; H02M 7/162; H02M 1/084
[52] U.S. Cl. .................................. 333/175; 333/177; 363/79; 363/80; 363/87
[58] Field of Search ............... 333/167, 168, 176, 175, 333/177, 181-185, 12, 24 R, 24 C; 307/105; 363/39, 40, 45, 47, 74, 75, 81, 173, 27, 28, 78-81, 87, 175-176

[56] References Cited

U.S. PATENT DOCUMENTS 3,660,787  5/1972  Mahmoud et al. .................. 333/181
4,078,216  3/1978  Kamber ............................. 333/176

Primary Examiner—Marvin L. Nussbaum
Attorney, Agent, or Firm—Roger W. Jensen

[57] ABSTRACT

A permanent magnet rotor type electrical alternator-SCR power supply having a unique series resonant LC circuit connected to the alternator and resonant close to the lowest expected frequency of the alternator.

2 Claims, 3 Drawing Sheets

REFERENCE CIRCUIT FOR ALTERNATOR OUTPUTS

The Government of the United States has rights in this invention pursuant to Contract No. N00024-79-C-6277 awarded by the Department of the Navy.

FIELD OF THE INVENTION

This application is a continuation-in-part of my prior application filed Dec. 16, 1983, Ser. No. 562,125, now abandoned in favor of this application.

This invention relates to the field of electrical power supplies, and more particularly to electrical systems in which an electrical load is energized from an alternator driven by an appropriate prime mover to supply the power required by the load. More specifically this invention pertains to electrical power supplies comprising (i) a high performance 3-phase ($3\phi$) alternator, the permanent magnet rotor of which is adapted to be rotated by a variable speed prime mover over a substantial range of angular velocity of, for example, two to one (2:1), (ii) a SCR (Silicon Controlled Rectifier) bridge for rectifying and controlling the $3\phi$ alternating current output from the stator windings of the alternator, and (iii) a closed loop control circuit operatively connected to the alternator windings, the SCR bridge output, and the SCR gates to control the output from the SCR bridge. My invention results in a new closed loop system having great advantages over prior art closed loop systems.

BACKGROUND OF THE INVENTION

There are, of course, numerous prior art variable speed alternator electrical systems; one example is the well known automotive alternator having a wound rotor, at least one stator winding, and a rectifier means connected to the stator winding but controlled in part by a connection to the rotor winding so as to produce a 12 volt (nominal) D.C. output.

In some applications, however, it is not possible to use a wound rotor type alternator. In some marine applications, e.g., torpedo systems, it is essential to utilize an alternator having a permanent magnet (hereinafter sometimes "P.M.") type rotor, i.e., no windings on the rotor, the P.M. rotor type alternator having two important advantages over the wound rotor type alternator. First, the P.M. rotor type alternator can supply a much higher power output (for a given alternator size or volume) as compared to a wound rotor type alternator. The second advantage is that the P.M. rotor type alternator output, as controlled by a SCR bridge arrangement, can be easily controlled so as to produce a zero output voltage, this being a critical strategic requirement of certain load systems adapted to be energized from the output of the alternator. To explain, there are certain conditions or strategic situations when it is essential to have the SCR bridge output voltage signal to be zero; failure to have this function accomplished is not acceptable. A wound rotor alternator combined with a conventional SCR bridge will not produce the desired function. However, a P.M. rotor type alternator combined with a SCR bridge will facilitate the desired function.

Thus, the setting for my invention is the necessity (as dictated by various requirements) of having a power supply meeting the following specifications:

(i) a very small but high power and high frequency $3\phi$ alternator with a P.M. rotor where the mechanical drive to the rotor would have a substantial variation in angular velocity while the power supply is under load,
(ii) a SCR bridge, and
(iii) a SCR phase control circuit operatively connected to the SCR bridge and the alternator windings in a closed loop system.

However, the technical specifications described above create two significant problems. The first is the very small, high frequency alternator has an output voltage which becomes severely distorted under load; the distortion in fact prevents the use of the state of the art SCR control techniques.

The second problem is related to the fact that P.M. rotor type alternators produce an electrical output, the magntidue of which is a direct function of the rotor speed, i.e., the faster the rotor R.P.M., the greater the output voltage. In fact, under "no-load" conditions, the alternator output voltage and frequency are directly proportional to the rotor speed. The variation in alternator output voltage, as a function of rotor speed, will cause a very undesirable corresponding variation in the output of the SCR bridge if not regulated by closed loop control.

To solve the first problem, a reference circuit was required having an output reference voltage which was (a) synchronized to the alternator frequency, and (b) was substantially free from harmonic distortion which causes jitter/ambiguous operation.

All A.C. power supplies have some degree of harmonic distortion. As indicated, with small, high frequency alternators, under load, this distortion can be very severe; this is shown in FIG. 3. This figure shows deep notches in barely recognizable sine waves. I tried to filter these wave forms with an integrator, however, "flat" spots remained on the otherwise fairly good looking sine waves. These flat spots, when compared with the error signal in the comparator (FIG. 5), produce uncertainties and cause jitter and instability. Successful operation with the flat spots was impossible and I was forced to abandon this approach.

I also considered these two alternatives:

A. Alternator Shaft Mechanical Timing Wheel: A time wheel arrangement with L.E.D. sensors fixed directly to the alternator shaft can provide timing signals. Since we were using a multi-pole machine, we'd need two L.E.D.s—one for pole location and the other to fix the relationship between shaft position and without voltage. Aside from balance problems at very high angular velocities, this approach is difficult-to-impossible to implement in the allocated volume.

B. Separate Rotor/Field Windings: This arrangement would produce nearly perfect sine-waves for timing purposes, but poses the same implementation problems as A above.

To solve the second problem, a special closed-loop regulating system was required.

BRIEF SUMMARY OF THE PRESENT INVENTION

The present invention solves both of the above described problems by providing a power supply having a unique reference circuit which receives, at its input, the highly distorted A.C. output from the P.M. rotor type alternator, and provides, at its output, an A.C. signal that is substantially free of the distortion. Thus the unique reference circuit provides an output for effective control of the SCR bridge, not withstanding the highly distorted 3∅ signals caused by to the SCR bridge when the system is under load. The reference circuit is receiving the same distorted input signal, but has the inherent capacity to effectively filter out unwanted harmonics of the fundamental or base signal.

The unique circuit comprises a series LC circuit which is transformer coupled to each winding of the alternator stator. An output resistor R is connected across the capacitor C, one end of the resistor being connected to a comparator means associated with the control means for controlling the firing angle of the SCRs in the rectifying bridge. In my preferred embodiment, the values of L and C are selected so that the resonant frequency ($f_o$) of the series circuit is substantially *below* the lowest *operating* frequency of the alternator. This arrangement provides the very important desired filtering function to correct for the distorted output from the alternator, i.e., the SCR control signal is essentially free from distortion; hence effective SCR control is made possible. In addition, the L, C and R components are carefully selected to provide the important advantage of an automatic control loop gain increase with increasing alternator angular velocity.

The present invention therefore comprises an electrical power supply which includes a 3∅ P.M. rotor type electrical alternator having a plurality of stator output windings, the rotor being subjected to a substantial variation in angular velocity or speed while the output windings are under electrical load thus causing the frequency of the output voltages in the output windings to vary from a first frequency (corresponding to a low speed) to a substantially higher frequency (corresponding to a substantially higher speed). The power supply further comprises a SCR bridge-type full wave rectifier means having (a) input means adapted to be connected to the output windings of the alternator, (b) output means adapted to supply DC electrical power to electrical load means, and (c) SCR gate means for controlling the firing angle of said SCR rectifier means in accordance with a control signal. The power supply additionally includes control means connected to the SCR gate means for providing a control signal thereto, the control means including (a) compartor means having an output connected to the SCR gate means and a pair of inputs, (b) means connecting said SCR output means to one of the inputs of said comparator means, and (c) a plurality of reference circuits connected respectively and selectively between each of said stator output windings and the other input of said comparator means. Each reference circuit includes a transformer having a primary winding connected to a stator output winding and a secondary winding, (ii) an inductor and a capacitor connected in series across said secondary winding, and (iii) an output resistor connected across said capacitor and also to the other input of said comparator means. In my preferred embodiment, the inductor and capacitor are selected so as to provide a series LC circuit having a resonant frequency $f_o$ selected to be substantially below the aforesaid first frequency.

My invention provides an output reference voltage which is substantially free from distortion eliminating jitter/SCR gate firing uncertainty. The invention further provides an automatic loop gain increase with an increasing alternator frequency thus providing a stable (i.e., non-oscillatory) closed loop regulatory system.

For a better understanding of the invention and its advantages, reference should be had to the drawings which form a further part hereof, and to the accompanying descriptive matter, in which there is illustrated and described a preferred embodiment of the invention.

DESCRIPTION OF THE PREFERRED EMBODIMENT

Figure 1:
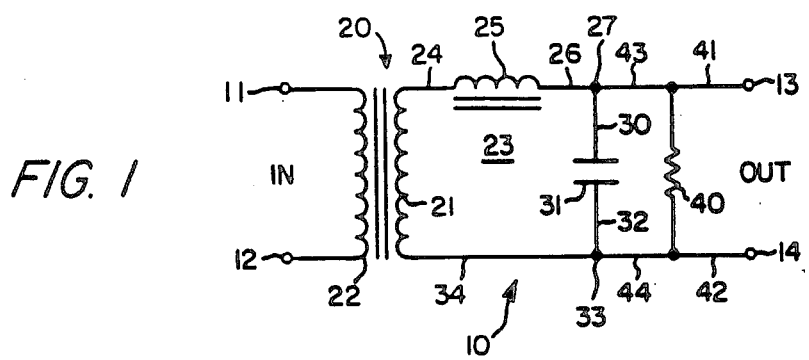
FIG. 1 is a wiring diagram of a reference circuit according to the invention.

Referring first to FIG. 1, a reference circuit 10 according to the invention comprises a pair of input terminals 11 and 12 adapted to be connected to an alternator stator winding and a pair of output terminals 13 and 14 to be connected to a utilization device, i.e., a SCR control circuit comparator.

A transformer 20 has a secondary winding 21 and a primary winding 22 connected to terminals 11 and 12. A series LC resonant circuit 23 is connected across secondary winding 21 and may be traced through conductor 24, an inductor 25, conductor 26, junction point 27, conductor 30, a capacitor 31, conductor 32, junction point 33, and conductor 34. An output resistor 40 is connected across terminals 13 and 14 by conductors 41 and 42, and across capacitor 31 by conductors 43 and 44. In my preferred embodiment, the values of inductance 25 and capacitor 31 are chosen to make circuit 23 resonant substantially below the lowest frequency expected at terminals 11 and 12.

Figure 2:
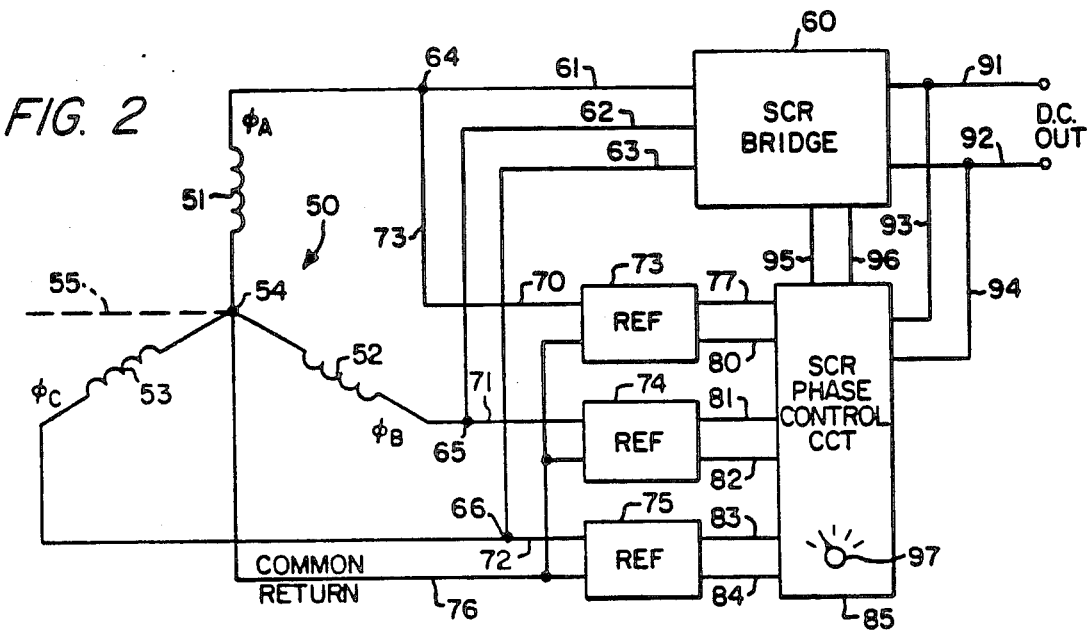
FIGS. 2 and 5 show electrical power supplies in which a plurality of the reference circuits are used.

FIG. 2 shows an application of the reference circuit described above. Here a 3∅ alternator 50 having windings 51, 52, and 53 with a common or neutral terminals 54 is driven by a suitable mechanical connection 55. The alternator windings are connected to a SCR bridge 60 by conductors 61, 62, and 63 having junction points 64, 65, and 66 which are connected by conductors 70, 71, and 72 all respectively as inputs to a plurality of reference circuits 73, 74, and 75 like circuit 10 of FIG. 1, and having a common input on conductor 76 from alternator neutral terminal 54. The reference circuits supply their outputs on conductors 77, 80, 81, 82, 83, and 84 to a phase control circuit 85 which may be of standard design. Bridge 60 supplies a direct current output on conductors 91 and 92, and that output is fed back through conductors 93 and 94 to control 85, which supplies a signal on conductors 95 and 96 to bridge 60 to maintain the direct current output at 91 and 92 at a command value determined by a manual adjustment 97 or an electrical signal.

Figure 5:
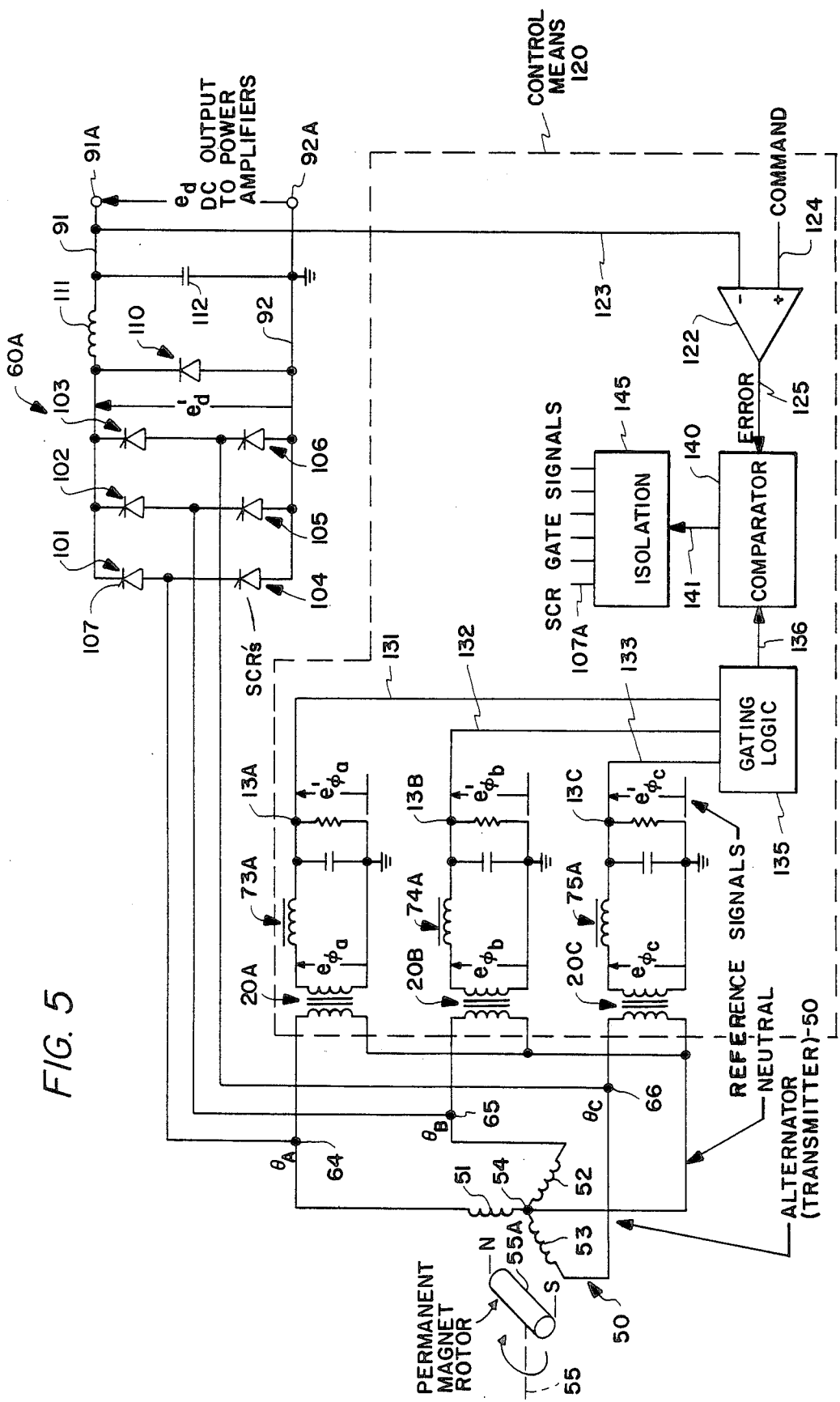

The power supply of FIG. 2 is shown in more detail in FIG. 5 where corresponding elements have the same reference numerals. The apparatus, i.e., electrical power supply shown in FIG. 5 comprises the combination of a 3∅ P.M. rotor type electrical alternator 50, the P.M. rotor being designated by reference 55a, being driven through the mechanical connection 55 by a variable speed prime mover, not shown. An example of a prime mover for such a power supply in a torpedo system would be a torpedo engine having a wide range in speed while under operation. This has the effect on the output on the alternator so that the frequency of the output voltages in the output windings of the alternator vary from a first frequency (corresponding to a relatively low speed of the prime mover engine) to a substantially higher frequency to a substantially higher speed of the engine. The aforesaid variation in engine speed is all while under operating conditions. A 2:1 ratio of high speed to low speed would be representative for this type of apparatus.

The electrical power supply further comprises in FIG. 5 the SCR bridge-type full wave rectifier means corresponding to bridge 60 of FIG. 2, the reference designator 60A being used in FIG. 5. The six SCR elements are designated by reference numerals 101 through 106 inclusive and are arranged in the well-known full wave configuration. Each SCR has a standard gate means; for example, SCR 101 gate means is identified by reference numeral 107.

The SCR bridge-type full wave rectifier 60A further comprises an inductor 111 and a capacitor 112 connected in series across the bridged SCRs, the junction point betewen inductor 111 and capacitor 112 being one of the rectifier output leads 91. The other side of capacitor 112 is connected to output lead 92. The power output terminals associated with leads 91 and 92 are identified by reference numerals 91A and 92A. Terminals 91A and 92A are thus a source of DC power available for application to load apparatus such as power amplifiers, not shown.

The SCR bridge rectifier 60A further comprises a free wheeling rectifier 110 which, as is known to those skilled in the art, is provided for the purpose of bypassing the load current during intervals of negative bridge input voltage. This results in a smaller output ripple voltage and less reactive power.

The electrical power supply further includes a control means generally designated by reference numeral 120. Control means 120 comprises three reference circuits 73A, 74A, and 75A connected respectively to the secondary windings of coupling transformers 20A, 20B, and 20C and further having respectively output terminals 13A, 13B, and 13C connected through leads 131, 132, and 133 to a gating logic means 135 which provides a means of selectively applying the outputs from the reference circuits through an output connection 136 which constitutes a first input to a comparator 140 of standard configuration and having a second input 125 which receives the output from a summing amplifier 122 which has a pair of inputs. The gating logic 135 presents a selected portion of the reference circuit output voltage, e.g., $e'\phi_a$, which is compared (in comparator 140) with the error voltage signal at 125. This selected portion decreases in amplitude as the alternator frequency increases in accordance with the teaching of my invention. When the error signal is greater than the reference signal at 136, the SCR is fired or "gated" or turned on. The first input to summing amplifier 122 is a D.C. feedback signal from the SCR bridge output; this input is received via lead 123 connected to output 91A of the SCR bridge 60A. The second input to the summing amplifier is a D.C. command signal means as at 124.

The comparator 140 has an output 141 which is applied through a standard isolation unit 145 having a plurality of outputs adapted to the connected respectively to the gate control means of the six SCR units in the bridge 60A. For example, isolation unit 145 has one of its outputs identified by reference numeral 107A to signify a connection to SCR gate control means 107 associated with SCR 101 of the bridge 68.

Thus, the control means 120 comprises a means connected to the SCR gate control means for providing a control signal thereto, the control means comprising the comparator means 140 having its output 141 connected to the SCR gate means, the comparator means also having a pair of inputs 125 and 136. A feedback signal is provided by the SCR output means 91A being connected via lead 123 and to summing amplifier 122 to one of the inputs 125 of the comparator; it being recognized by those skilled in the art that an error signal will be developed by summing amplifier 122 so as to be applied to comparator 140 as a function of the summing of (i) a command signal appearing at 124 and (ii) the output of the SCR bridge at 91 as applied to lead 123.

The control means further comprises a plurality of reference circuits 73A, 74A, and 75A which are connected respectively and selectively between each of the stator output windings 51, 52, and 53 and the other input 136 of the comparator means 140. The reference circuits of course are shown in great detail in FIG. 1 wherein, for example, the transformer 20, the inductor 25, and the capacitor 31 are shown with the inductor and the capacitor being connected in series across the secondary winding of the transformer. The output resistor is connected across the capacitor and also, selectively, connected to the other input of the comparator means through leads 131, 132, and 133 and gating logic 135.

Figure 3:
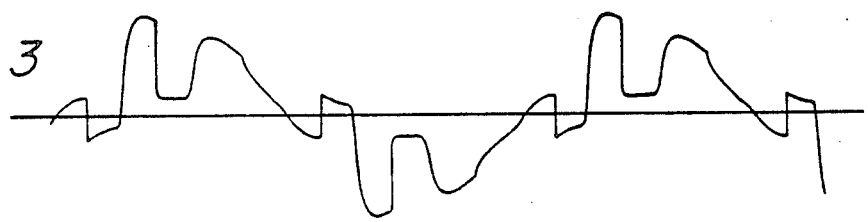
FIGS. 3 and 4 show wave forms.
Figure 4:

Referring to FIG. 4, a sine wave is depicted being representative of the output from one of the stator windings for a particular rotor speed or alternator output frequency under zero load conditions. FIG. 4 therefore could be termed an idealized wave form to be available for application to the SCR bridge as well as to the reference circuit for controlling the SCR bridge. Unfortunately, in the application of alternators which form the stimulus for the making of this invention, the output wave form is typically distorted when the power supply is supplying a load to the load devices, which distorted wave form is generally depicted in FIG. 3 where the overall sinusoidal nature of the wave shape can be generally discerned. It has been found that a highly distorted wave form such as depicted in FIG. 3 is simply unsatisfactory for use as a reference signal in a SCR control circuit. This is because this type of waveform, when compared with the error signal at 125, will cause uncertain firing times of the SCRs. Even if smoothed with conventional RC circuits, the reference circuit output slope changes result in the aforementioned uncertain firing times and "jitter." This is unsatisfactory.

The unique reference circuit provided by my invention as described above has the effect of removing substantially all of the distortion from the distorted signal thereby leaving a relatively "clean" signal for use in the SCR control means 120. Thus, with reference is FIG. 5 the reference circuits 73A, 74A, and 75A provide a first function of filtering the distorted signals and thereby providing relatively clean reference signals to the comparator 140 and hence to the SCR gate means, e.g., gate 107 of SCR 101.

Figure 6:
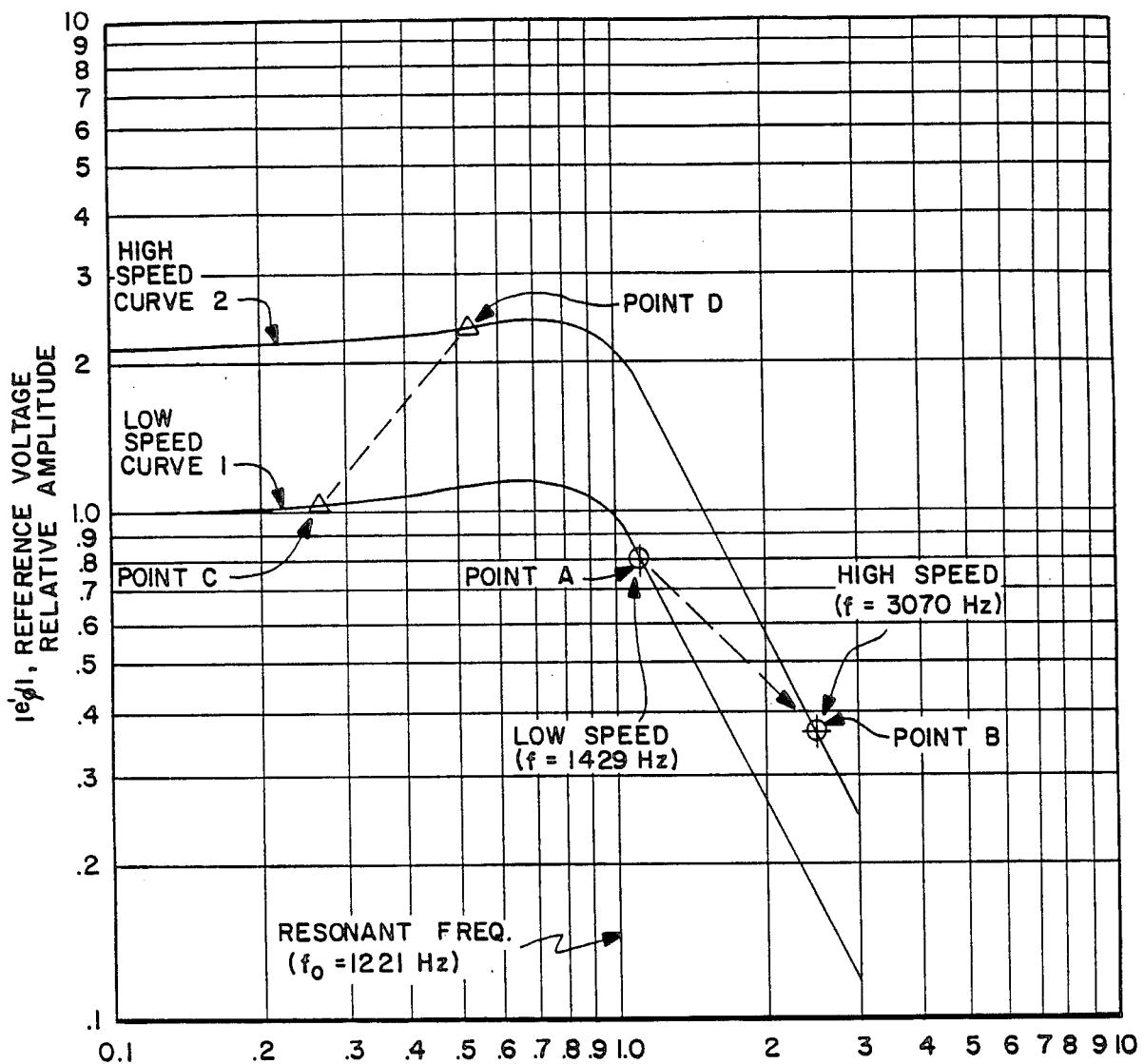
FIG. 6 shows graphical relationships between the P.M. rotor angular velocity and the reference voltage relative amplitude.

In addition, the unique reference circuits also provides an automatic loop gain increase in accordance with an increase in speed of rotation of the P.M. rotor. This may be more easily understood by reference to FIG. 6 (using log-log presentation) a showing of variation in the reference voltage relative amplitude as a function of W, the normalized rotor angular velocity. Point A in FIG. 6 shows a reference voltage relative amplitude of approximately 0.8 for a low speed frequency of 1429 Hertz. Point B on the plot shows a reference voltage relative amplitude between 0.3 and 0.4 for a higher speed angular velocity corresponding to an output frequency of 3070 Hertz. Thus, for a more than 2:1 increase in rotor angular velocity and alternator output voltage, the reference voltage relative amplitude as appearing at terminals 13a, 13b, and 13c of FIG. 5 had actually decreased more than 50 percent.

To summarize the operation of the control means 120, it is seen that a comparator 140 receives the outputs from the reference circuits on a selective basis (through the function of the gating logic 135), these reference signals being supplied selectively to the first input 136 of the comparator 140. The other input 125 of the comparator 140 receives the D.C. output from the summing amplifier 122 which, as aforesaid, receives the D.C. feedback signal from output 91 of the SCR bridge 60A and also receives a D.C. command signal at 124. The output of the comparator 141 thus becomes an SCR gate signal and is applied through the isolation means 145 and the connection means, e.g., 107A so as to control the firing angles of the individual SCR units 101–106. Those skilled in the art will understand that the firing angle can be controlled from 0 degrees whereat the SCR bridge is "full on" at which point the SCRs can be considered to be diodes to the other extreme of the firing angle being 120 degrees. In this manner, the D.C. output voltage of the SCR bridge as measured between terminals 91A and 92A can vary from 0 to a maximum value. It will be further understood by those skilled in the art that the command signal as at 124 (which can be either a manual arrangement such as 97 shown in FIG. 2 or some automatic or semiautomatic signal) will be usable so as to in turn control the D.C. output at 125 of the summing amplifier 122 to in turn control the magnitude of the output of comparator 140 as at 141 so as to control the SCR firing angles, as aforesaid, from 0 degrees to 120 degrees whereat no current flows through the SCRs and the output voltage at 91A–92A is zero.

As mentioned above, one of the problems of the high power and speed P.M. rotor type alternator is the variation in output voltage as a direct function of rotor speed, i.e., rotor angular velocity. To solve this requires an appropriate closed-loop regulating system which is disclosed in FIG. 5 in accordance with my invention.

Figure 7A:
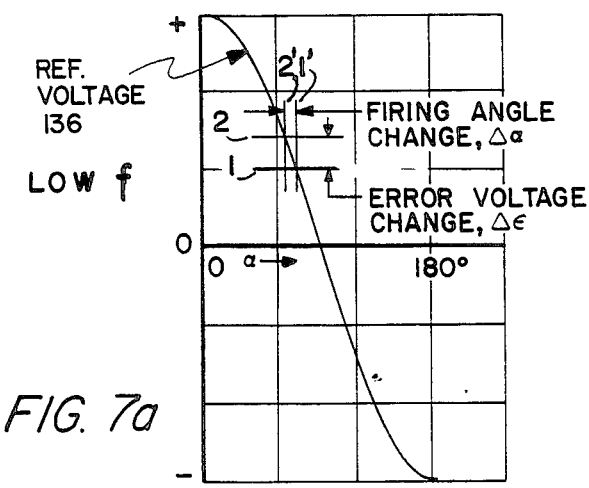
FIGS. 7A and 7B show the firing angle α of the SCRs as a function of the interaction of (a) the error voltage and (b) reference voltage as applied to the comparator.
Figure 7B:
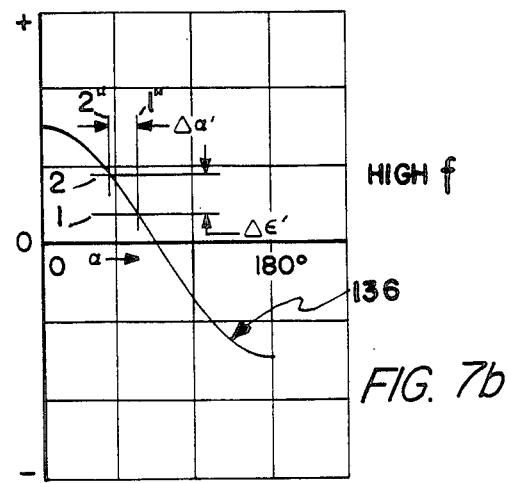

FIGS. 7A and 7B show in graphical form the relationship between the firing angle ($\alpha$) of the SCRs (horizontal axis) as a function of the comparision (in comparator 140) of the D.C. error voltage appearing at 125 and the reference voltage appearing at 136. FIG. 7A is representative of the reference voltage at a first or "low" frequency, e.g., 1429 Hertz and FIG. 7B is representative of the reference voltage at a higher frequency, e.g., 3070 Hertz, i.e., at points A and B in FIG. 5.

Referring to FIG. 7A, the reference voltage signal 136 is depicted as a "portion" of the "clean" output from the reference circuit, e.g., 73A; the depicted portion having a cosine characteristic. That is, the reference voltage is at a maximum positive value when $\alpha$ is zero and at a maximum negative value when $\alpha$ is 180 degrees. The error voltage is depicted in FIG. 7A as a horizontal line 1 indicative of a first level of error signal at 125 and a second and higher or "more positive" horizontal line 2 representative of a higher or greater error signal at 125. When the error signal 1 exceeds the reference voltage signal 136, then the appropriate SCR fires, the firing angle ' of the SCR being that at the intersection 1' of error signal 1 and reference voltage 136. If a larger output voltage at 91A were desired, then a larger error voltage signal 2 would be provided (via command means 124); this would cause the SCR to fire sooner as shown by intersection of error signal 2 with reference voltage 136 at 2' on FIG. 7A. As noted above, as $\alpha$ approaches zero, the SCRs approach maximum conduction.

FIG. 7B shows a very important feature of my invention. First, it is seen that the magnitude of the reference voltage 136 is much less than that of FIG. 7A. Secondly, for the same change in error voltage as in FIG. 7A, i.e., error voltage is 1 and 2, the resultant $\Delta\alpha$ is much larger, see intersections 1" and 2". This has great significance in the closed loop system operation.

In closed loop systems, "open loop" gain is an important consideration. It can be shown that the open loop gain, for stable operation in this type of system, must be less than:

$$\text{Open Loop Gain} < \frac{Kf^2 L_{111} C_{112}}{V_p} = KL_{111}C_{112}f \times \left(\frac{f}{V_p}\right)$$

where:

$$K = \frac{12\pi^2}{G_1 \sin\alpha}$$

$G_1$ is a gain constant, and $V_p$ is the alternator output voltage (peak value).

If, for example, we increase the operating frequency, f, the output inductor 111 or capacitor 112 size, we can also increase the open loop gain. If, on the other hand, we increase the alternator output voltage, $V_p$, we must reduce the gain.

In this application, the ratio $f/V_p$ stays approximately constant and so we can increase the open loop gain in proportion to the frequency f. My invention automatically does this because as the frequency f increases, the reference circuit output voltage decreases as shown in FIGS. 6, 7A and 7B.

With a smaller reference voltage, we get a larger change in firing angle $\Delta\alpha$ for a given change in error signal $\Delta\epsilon$. Hence, the "open-loop" gain has increases, and increased open-loop gain brings with it better output voltage regulation and better system response.

The above described important advantage can be appreciated even more by comparison with the teaching of Mahmoud U.S. Pat. No. 3,660,787, cited against my original application Ser. No. 562,125, to be abondoned. This prior art, if used in a closed loop system, would result in a first reference voltage signal designated as Point C on the low speed curve of FIG. 5 and a second, much higher magnitude, reference voltage signal designated as Point D on the high speed curve of FIG. 5. This would have an opposite effect on the change in firing angle $\Delta\alpha$ of the SCRs (as compared to my invention), i.e., for the same $\Delta\epsilon$ and $\Delta\epsilon'$ as FIGS. 7A and 7B, the resultant $\Delta\alpha$ would be much smaller than that for my invention because the reference voltage magnitude is much larger. The reduced Δα in turn produces reduced system gain. In stark contrst, as aforesaid, my invention results in the reference voltage magnitude for the higher frequency being made smaller (FIG. 7B) thus yielding the much larger Δα for providing the highly desired increased system gain in turn resulting in better output voltage regulation and dynamic performance.

The key for achieving the above-described highly desirable result of automatically lowering the reference voltage relative amplitude as a function of increasing rotor angular velocity is in the design of the reference circuit. More specifically, it is desired in my preferred embodiment to have the resonant frequency of the reference circuit selected (for an increasing alternator frequency) so that the higher output voltage from the alternator windings resulting from the higher rotor angular velocity will actually result in a decrease in the reference voltage relative amplitude. In my preferred embodiment for the apparatus used in a specific application, the optimum design of the reference circuit was to select the values of L and C for the inductor 25 and capacitor 31 respectively so that the resonant frequency of the reference circuit was subtantially below the alternator frequency corresonding to the low speed operation. For this specific case, as is depicted in part with reference to FIG. 6, the resonant frequency of the reference circuit is shown to be 1220 Hertz which is substantially below the frequency of 1429 Hertz depicted for the low speed operation. Values for the components in my unique reference circuit which produce the results depicted in FIG. 6 are as follows:

Inductor 25: 25.0 millihenries
Capacitor 31: 0.68 microfarads
Resistor 40: 187 ohms The alternator used is manufactured by Garrett Airresearch, Torrance, California, and has model designator 518429-5-1. The power supply depicted is intended for supplying an output between 0 and +150 volts D.C.

Those skilled in the art will understand that the benefits of my invention will be enjoyed even as the resonant frequency of the reference circuit is shifted above to optimum point described above, but the benefits will diminish as follows. As the resonant frequency increases, the automatic increase in gain will diminish and become less and less effective until one gets to a point where there is essentially no automatic gain increase. Then, as the resonant frequency further increases, we would have a decreasing gain situation which would be counter-productive. This is the arrangement of the prior art U.S. Pat. No. 3,660,787, discussed above.

Thus, my invention provides an output reference voltage which is substantially free from distortion for use in accurately controlling the SCR rectifiers. The invention further provides an automatic gain arrangement for compensating for undesired variations in the magntiude of the alternator output as a function of rotor speed.

I claim:

1. An electrical power supply comprising in combination:
    (1) a 3φ, permanent magnet rotor type electrical alternator having a plurality of stator output windings, said rotor being subjected to a substantial variation in angular velocity or speed while said output windings are under electrical load so that the frequency of the output voltages in said output windings varies from a first frequency (corresponding to a low speed) to a substantially higher frequency (corresponding to a substantially higher speed);
    (2) SCR bridge type full wave rectifier means having
        (a) input means adapted to be connected to said alternator output windings,
        (b) output means adapted to supply D.C. electrical power to electrical load means, and
        (c) SCR gate means for controlling the firing angle of said SCR rectifier means in accordance with a control signal; and
    (3) control means connected to said SCR gate means for providing a control signal thereto, said control means comprising:
        (a) comparator means having an output connected to said SCR gate means and a pair of inputs,
        (b) means connecting said SCR output means to one of the inputs of said comparator means, and
        (c) a plurality of reference circuits connected respectively and selectively between each of said stator output windings and the other input of said comparator means, each reference circuit comprising
            (i) a transformer having a primary winding connected to a stator output winding and a secondary winding,
            (ii) an inductor and a capacitor connected in series across said secondary winding, and
            (iii) an output resistor connected across said capacitor and also to said other input of said comparator means,
        said inductor and capacitor comprising a series LC circuit having a resonant frequency $f_o$ selected so that the relative amplitude of the reference voltage appearing at said output resistor decreases as the frequency of the output voltage in said output windings increases.

2. Apparatus of claim 1 further characterized by $f_o$ being 0.85 of said first frequency.

* * * * *